US012717641B2

(12) United States Patent
Foster et al.

(10) Patent No.: US 12,717,641 B2
(45) Date of Patent: Aug. 25, 2026

(54) DETECTING APPLICATION PROGRAMMING INTERFACE (API) SEQUENCES AND MITIGATING API SEQUENCE ABUSE AT THE EDGE OF A DISTRIBUTED CLOUD COMPUTING NETWORK

(71) Applicant: CLOUDFLARE, INC., San Francisco, CA (US)

(72) Inventors: Peter Alexander Foster, London (GB); Louis Vincent Barthonet, London (GB); Maciej Jakub Biłas, Warsaw (PL); Maxime Valentin Junior Guerreiro, Munich (DE); Jan Rüth, Aachen (DE); Thomas Adriaan M Vissers, Kapellen (BE)

(73) Assignee: CLOUDFLARE, INC., San Francisco, CA (US)

( * ) Notice: Subject to any disclaimer, the term of this patent is extended or adjusted under 35 U.S.C. 154(b) by 241 days.

(21) Appl. No.: 18/401,192

(22) Filed: Dec. 29, 2023

(65) Prior Publication Data

US 2025/0217205 A1 Jul. 3, 2025

(51) Int. Cl.
*G06F 9/50* (2006.01)
*G06F 9/54* (2006.01)
*G06F 21/56* (2013.01)

(52) U.S. Cl.
CPC .............. *G06F 9/5072* (2013.01); *G06F 9/54* (2013.01); *G06F 9/541* (2013.01); *G06F 9/546* (2013.01); *G06F 21/56* (2013.01); *G06F 21/566* (2013.01)

(58) Field of Classification Search
CPC .......... G06F 9/5072; G06F 9/54; G06F 9/541; G06F 9/546; G06F 21/56; G06F 21/566
See application file for complete search history.

(56) References Cited

U.S. PATENT DOCUMENTS 9,569,288 B2 2/2017 Cui et al.
10,699,010 B2 6/2020 Subbarayan et al.
(Continued)

OTHER PUBLICATIONS

Hussain et al., "Intelligent Service Mesh Framework for API Security and Management", 2019, IEEE, pp. 0735-0742 (Year: 2019).*

(Continued)

*Primary Examiner* — Charles M Swift
(74) *Attorney, Agent, or Firm* — NICHOLSON DE VOS WEBSTER & ELLIOTT LLP

(57) ABSTRACT

A first compute server of a distributed cloud computing network that includes multiple compute servers receives an API request that is directed to an API endpoint. The first compute server determines an identifier that uniquely identifies a session that is associated with the API request. Based on the determined identifier, the first compute server determines which of the compute servers of the distributed cloud computing network is responsible for storing information about previous API operations associated with the determined identifier. The first compute server transmits an API sequence request to the determined compute server. In response, the first compute server receives information that specifies a time-ordered sequence of API operations associated with the determined identifier most recently observed. The first compute server may enforce a rule based at least on a sequence of at least two of the latest API operations.

20 Claims, 7 Drawing Sheets

(56) References Cited

U.S. PATENT DOCUMENTS

| | | | | |
|---|---|---|---|---|
| 11,068,594 | B2 * | 7/2021 | Stahlberg | G06F 21/554 |
| 11,354,409 | B1 * | 6/2022 | Kenefick | G06F 21/51 |
| 2013/0128883 | A1 * | 5/2013 | Lawson | H04M 7/0021 370/352 |
| 2019/0114417 | A1 * | 4/2019 | Subbarayan | H04L 41/145 |
| 2019/0394042 | A1 * | 12/2019 | Peddada | H04L 9/0894 |
| 2020/0045065 | A1 * | 2/2020 | Sanap | H04L 63/1483 |
| 2020/0159597 | A1 * | 5/2020 | Gino | G06F 16/24539 |
| 2021/0377247 | A1 * | 12/2021 | Nigro | H04L 9/3239 |

OTHER PUBLICATIONS

Xiaofeng et al., ASSCA: API based Sequence and Statistics features Combined malware detection Architecture, ScienceDirect, Procedia Computer Science, vol. 129, 2018, pp. 248-256.

Cosgrove et al., Detecting API abuse automatically using sequence analysis, Mar. 15, 2023, The Cloudflare Blog, Cloudflare, 10 pages.

Solomon et al., Announcing API Abuse Detection, Mar. 26, 2021, The Cloudflare Blog, Cloudflare, 12 pages.

* cited by examiner

DETECTING APPLICATION PROGRAMMING INTERFACE (API) SEQUENCES AND MITIGATING API SEQUENCE ABUSE AT THE EDGE OF A DISTRIBUTED CLOUD COMPUTING NETWORK

FIELD

Embodiments of the invention relate to the field of network processing; and more specifically, to detecting application programming interface (API) sequences and mitigating API sequence abuse at the edge of a distributed cloud computing network.

BACKGROUND

Application programming interfaces (APIs) are used widely in modern application development. Many applications use APIs including online banking, e-commerce, social media, cloud computing, etc. APIs are vulnerable to various types of attacks and abuse such as data exfiltration, unauthorized access, denial-of-service, etc. API volumetric abuse protection exists to prevent and mitigate the abuse of APIs by controlling the volume of API requests. The session traffic statistics of an API endpoint can be analyzed and a rate limit can be applied. However, certain API attacks or abuse can occur without violating the rate limit.

An application can use multiple API endpoints for different API operations. It is common for legitimate uses of the API endpoints to follow a particular sequence of operations where a deviation of the sequence may indicate malicious behavior. As an example, instead of using a shopping cart API call to first add items to a shopping cart, a malicious actor may use a purchase API call to directly submit purchases. However, detecting a legitimate API sequence versus a malicious API sequence is challenging. For instance, the sequential patterns that characterize normal behavior instead of malicious behavior (and vice versa) cannot be readily determined by frequency of occurrence alone. Also, the boundaries of sequential patterns are not readily defined because streams of API requests do not contain obvious separators that indicate boundaries between sequential patterns. Finally, sampling at the level of HTTP (to try to mitigate against the problem of processing millions of requests per second) does not work because the sequence would be broken.

SUMMARY

In one aspect, a method is performed to identify API requests observed by a distributed cloud computing network and provide analytics about the identified sequences. API request information of multiple API requests received at multiple edge compute servers of a distributed cloud computing network is received. API sequences are identified from the API request information, where each particular identified sequence is associated with a particular session identifier and host. Each particular identified sequence includes a time-ordered set of at least two API requests. Each of the identified sequences is scored, where a particular score for a particular API sequence represents an indication of interest value. The API sequences associated with a particular host are ranked according to the scores. At least those of the API sequences that have a top ranking are surfaced to customers.

In one aspect, a method is performed for mitigating API abuse at a distributed cloud computing network. An API request is received at a first edge compute server of the distributed cloud computing network, the API request being directed to an API endpoint of a host. Based at least on information included in the API request, an identifier is determined that uniquely identifies a session that is associated with the API request. Based on the determined identifier, the first edge compute server determines which of the edge compute servers of the distributed cloud computing network is responsible for storing information about previous API operations associated with the determined identifier. The first edge compute server transmits an API sequence request to the determined edge compute server that is responsible for storing information about previous API operations associated with the determined identifier. In response, the first compute server receives, from the determined edge compute server, information that specifies a time-ordered sequence of up to a predefined number of API operations associated with the determined identifier most recently observed. The first edge compute server may enforce a rule based at least on a sequence of at least two of the latest API operations associated with the determined identifier including the API operation of the first API request.

In an aspect, based on the identified sequences (e.g., the top-ranked sequences), the system may suggest one or more API sequence rules for abuse mitigation.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
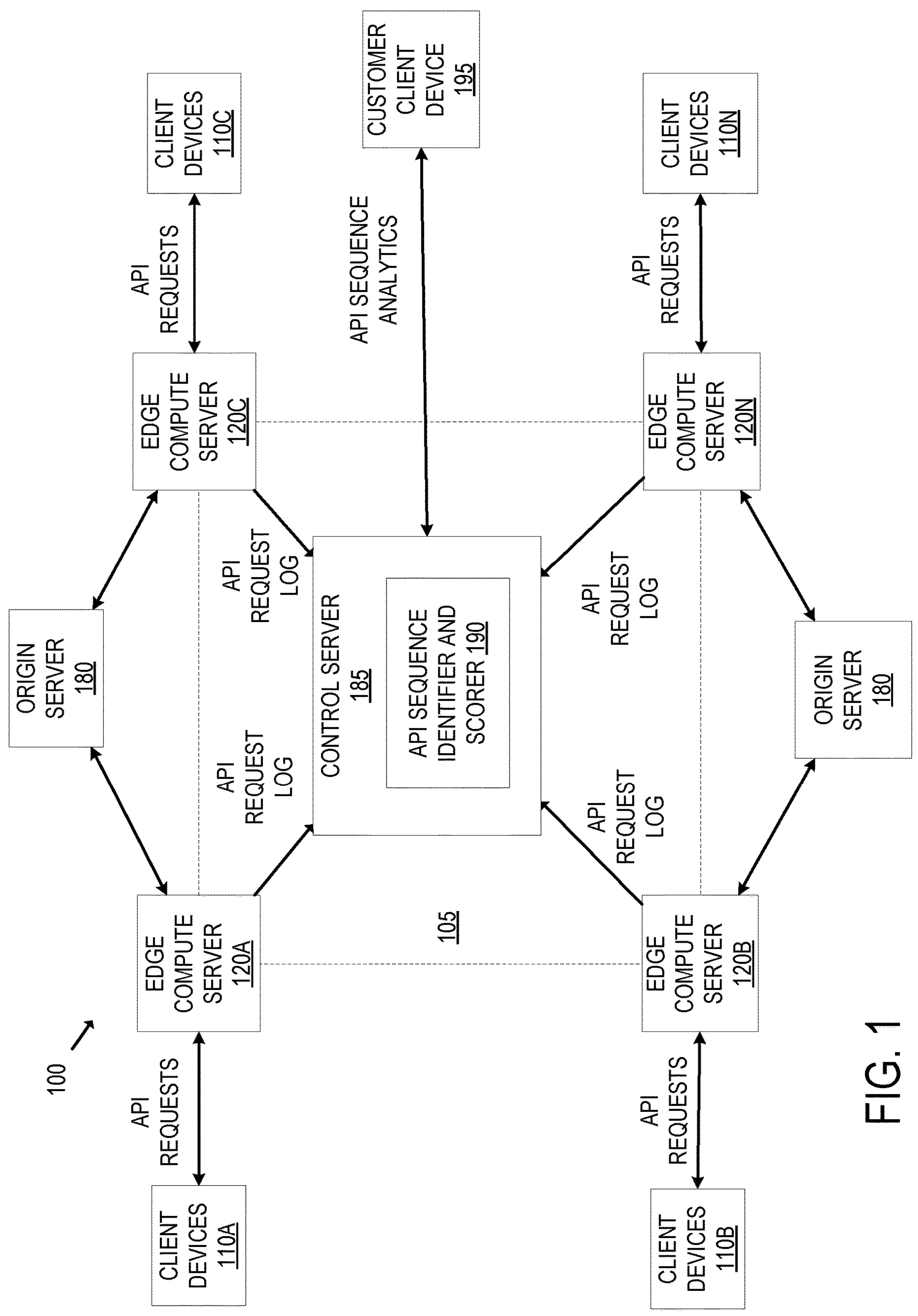
FIG. 1 illustrates a system for identifying a sequence of API requests observed by a distributed cloud computing network and providing analytics about the identified sequences according to an embodiment.

Some embodiments include identifying a sequence of API requests observed by a distributed cloud computing network and providing analytics about the identified sequences. The distributed cloud computing network includes multiple edge compute servers operating in multiple locations where each edge compute server can receive API requests. Thus, API requests for the same endpoint or the same zone can be received at different edge compute servers of the distributed cloud computing network. Different edge compute servers can receive API requests for the same API endpoint because of the location of the requesting clients. As an example, these API requests may be made by a specific visitor as they browse a website, use a mobile application, or interact with another application via an API.

Each edge compute server of the distributed cloud computing network may be in one or more server groups (e.g., one or more logical or physical groupings of servers). For example, the edge compute servers may be distributed in different colocation centers (colos), data centers, and/or point-of-presences (PoPs). API sequences are determined from the API requests observed by the edge compute servers of the distributed cloud computing network. Each edge compute server may transmit API request information (e.g., log information) to a central server for identifying sequences and providing analytics.

The API request information for each API request can include the API operation, the time when the API operation was received at that server, the request method (e.g., HTTP GET, HTTP POST), the session identifier associated with the request, an identifier of the server group to which the edge compute server that received the request belongs, and an identifier of the edge compute server that received the request. An API sequence is a time-ordered set of API requests associated with a particular identifier (e.g., a session identifier) to the same host or to a grouping of hosts as configured by the administrator of the hosts. The set of API requests may be specified by the API operations and request methods. The API operation sequences are identified by applying a sliding window of length N to the API requests observed for a particular identifier (e.g., a session identifier) and for a particular server group that received the API requests. Because the sequences can be identified over a sliding window, the requests of the sequences can overlap. For instance, a particular API request can be in multiple identified sequences. In contrast to sampling at the request level which breaks sequences, the API operation sequences are sampled at the level of sessions.

The identified sequences are scored by an API sequence scorer. The API sequence scorer estimates the probabilities of sequences and individual operations. The API sequence scorer may also provide a confidence value that indicates the degree of certainty the sequence did not arrive due to an out-of-order event. This confidence value can be used to adjust the probability estimates of sequences during scoring. In an embodiment, the API sequence scorer ranks sequences according to correlation scores, where a correlation score indicates the amount of association between operations in a sequence. A higher correlation value indicates that API operations are more likely to occur together in the given sequence versus occurring individually in any other context. In another embodiment, the API sequence scorer learns a complete statistical model of the API behavior (e.g., using probabilistic suffix trees (PSTs)) and ranks the sequences according to a correlation score that considers the complete statistical model.

The API sequence scorer periodically inserts the list of sequences ranked by correlation score into a data structure that can be exposed to a customer on a dashboard or report. A top-ranking sequence may be one that is significant, where significance is a measure of how important the individual operations are within the sequence. The customer can then act on this report, such as securing endpoints if the sequence is expected or applying rules (e.g., rate limiting, blocking, etc.) if such a sequence is not expected.

In some embodiments, either alone or in cooperation with the embodiments describing identifying the sequence of API requests and providing analytics about the same, API sequences are detected at the edge of the distributed cloud computing network (e.g., at the edge compute servers) and API sequence rules are enforced at the edge of the distributed cloud computing network (e.g., at the edge compute servers). As an example, an API sequence rule can be defined to allow only certain API sequences (and all other API sequences are blocked). As another example, an API sequence rule can be defined to explicitly block certain API sequences (and all other API sequences are allowed). A customer can have a combination of API sequence rules.

In an embodiment, based on the identified sequences (e.g., the top-ranked sequences), the system may suggest one or more API sequence rules for abuse mitigation. For example, an API sequence rule may be suggested when the probability that given a particular operation, that particular operation will have been immediately preceded by another particular operation, is above a threshold.

FIG. 1 illustrates a system for identifying a sequence of API requests observed by a distributed cloud computing network and providing analytics about the identified sequences according to an embodiment. The system 100 includes the client devices 110A, 110B, 110C, and 110N, the edge compute servers 120A-N, the origin server 180, the control server 185, and the customer client device 195. Each client device is a computing device (e.g., laptop, workstation, smartphone, mobile phone, tablet, gaming system, set top box, wearable device, Internet of Things (IoT) device, etc.) that can transmit and/or receive network traffic. Each client device may execute a client network application such as a web browser, native application, or other application that can access network resources (e.g., web pages, images, word processing documents, PDF files, movie files, music files, or other computer files).

The edge compute servers 120A-N and the control server 185 are part of the distributed cloud computing network 105. There may be hundreds or more edge compute servers 120. Each edge compute server 120 is part of one or more server groups (e.g., one or more logical or physical groupings of servers). The edge compute servers 120 may be distributed in different colocation centers (colos), data centers, and/or PoPs. As an example, an edge compute server 120 may be part of a first colo of multiple colos within a PoP. There may be multiple PoPs in the distributed cloud computing network 105. Each edge compute server 120 can receive API requests for the same endpoint and zone. As an example, different edge compute servers can receive API requests for the same API endpoint because of the location of the requesting clients. Although not illustrated in FIG. 1, there are other physical devices between the edge compute servers 120A-N such as routers, switches, etc.

Each edge compute server 120 is coupled with the control server 185. The control server 185 is operated by the distributed cloud computing network 105. The control server includes, among other things, the API sequence identifier and scorer 190 that identifies sequences of API requests and provides analytics about the identified sequences. API request information (e.g., API request logs) from each edge compute server 120 are periodically provided to the API sequence identifier and scorer 190. The customer client device 195, which belongs to a customer of the distributed cloud computing network 105, can access the analytics about the identified sequences provided by the API sequence identifier and scorer 190 through a dashboard or other interface provided by the control server 185.

Figure 2:
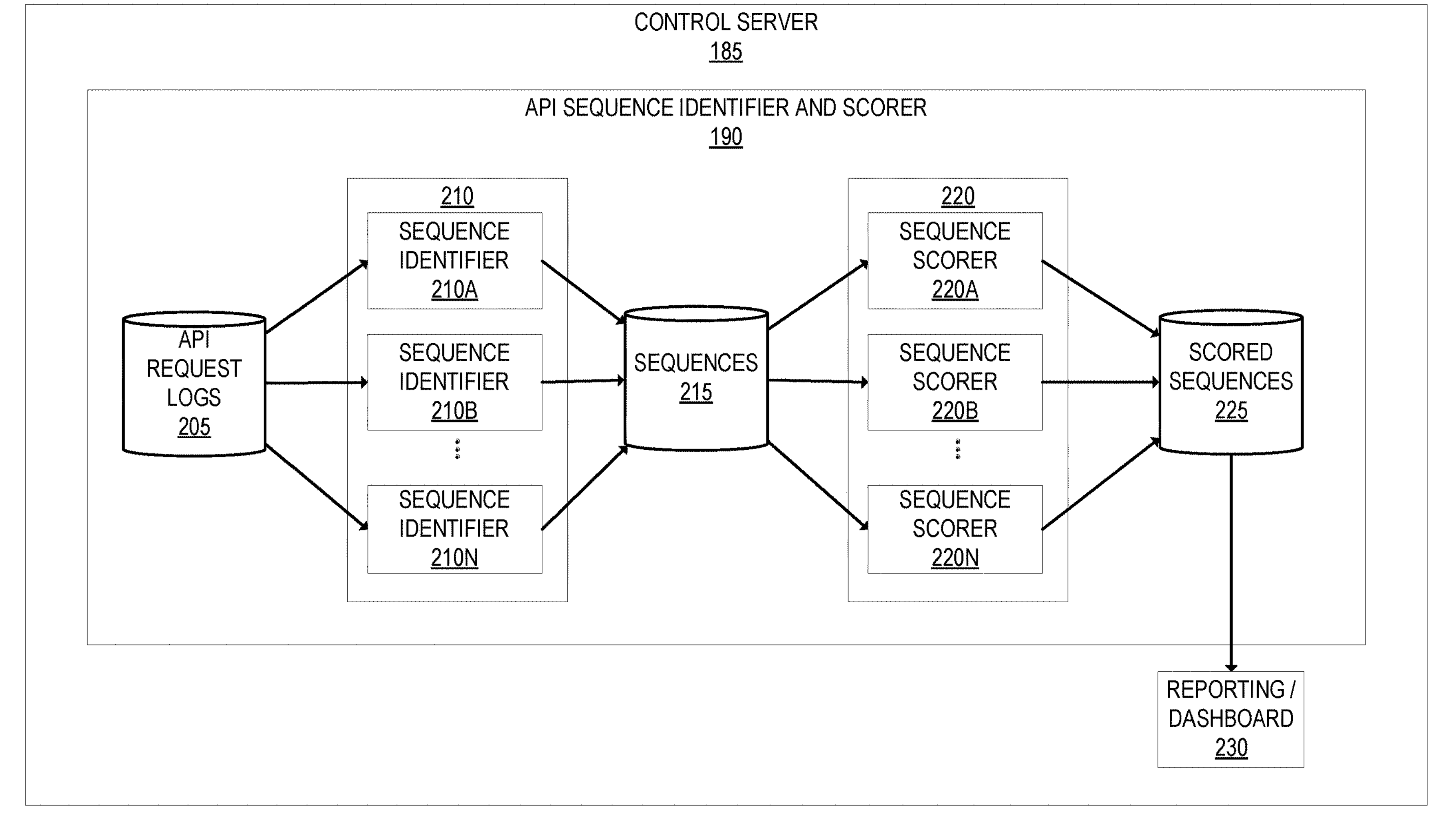
FIG. 2 illustrates an example of the API sequence identifier and scorer 190 in more detail according to an embodiment.

FIG. 2 illustrates an example of the API sequence identifier and scorer 190 in more detail according to an embodiment. The API sequence identifier and scorer 190 includes the distributed sequence identifier 210 and the distributed sequence scorer 220.

The distributed sequence identifier 210 includes multiple sequence identifiers 210A-N. Each sequence identifier 210 receives API operations from the API request logs 205. The API request logs 205 may include, for each API request: the API operation, the time when the API operation was received at that server, the request method (e.g., HTTP GET, HTTP POST), the session identifier associated with the request, an identifier of the server group to which the edge compute server that received the request belongs, and an identifier of the edge compute server that received the request. The API request logs 205 may be partitioned by the server group identifier (e.g., colo identifier) and session identifier such that a particular sequence identifier 210 receives all the API request information for a particular server group identifier and session identifier pair.

A sequence identifier 210 identifies sequences by applying a sliding window of length N to the API requests observed for a particular identifier and for a particular server group that received the API requests. Thus, the sequence identifier 210 identifies API sequences of length N, where N is the number of API operations. The value of N may be configurable by the customer or may be set by the provider of the distributed cloud computing network 105. A higher N leads to a higher number of identified sequences. Because the sequences can be identified over a sliding window, the requests of the sequences can overlap. For instance, a particular API request can be part of multiple identified sequences. The sequence identifiers 210A-N store the identified API sequences in the sequences store 215.

In an embodiment, the sequence identifier 210 performs a sampling of the API operation sequences at the session level. The sequence identifier 210 may be configured with a maximum number of active buffers for each host, where each buffer corresponds to one session. A buffer can be implemented as a min-max heap data structure. Each buffer is associated with a timestamp that indicates the time of the last update (a last updated timestamp). The buffers reside in a min-heap on the last updated timestamps. Upon consuming a request from the API request logs 205, the sequence identifier 210 determines whether the request corresponds to a session for which there is already a buffer. If a buffer already exists, and is accepting requests, the request is added to that buffer. If a buffer does not exist, and the configured maximum number of buffers has not been reached, a new buffer is created and the request is added to the buffer. Otherwise, the request is discarded (e.g., if a buffer exists but the buffer is not accepting requests; or if a buffer does not exist but the configured maximum number of buffers has been reached). Each buffer has a configured maximum capacity, and a lifetime. If the size of the buffer reaches the maximum capacity or if the buffer's age since creation reaches the lifetime, the buffer's state is updated to no longer accept requests. When a request has resided in a buffer for a duration greater than the lifetime, it is removed from the buffer and used to assemble a sequence in a sliding-window fashion.

It is possible that API requests can be received out-of-order. This may occur due to the way the API requests are organized at the control server 185. For example, the API requests may be stored/organized in a way that does not guarantee strict in-order arrival. To mitigate against this, the sequence identifier may buffer API requests based on their age (e.g., current time on arrival minus the timestamp of the request). Those API requests whose age is less than or equal to a threshold (e.g., 10 minutes) are admitted for processing while those API requests whose age is greater than the threshold are not admitted for processing and are discarded. The rate at which such API requests are discarded can be used by the distributed sequence scorer 220 to adjust probability estimates.

Since API sequences of interest may not necessarily be characterized by volume alone (e.g., frequent API sequences may or may not be of interest), the API sequence identifier and scorer 190 scores the identified API sequences to rank API sequences. Further, the score is used to determine sequence boundaries which are otherwise not readily identifiable in the stream of API requests. The distributed sequence scorer 220 includes multiple sequence scorers 220A-N. Each sequence scorer 220 receives identified API sequences from the sequences store 215. The sequences store 215 may be partitioned by zone and host (or zone and grouping of configured hosts where such grouping can use wildcarding) such that a particular sequence scorer 220 receives all the identified sequences for a particular zone and host. Each API sequence scorer 220 estimates the probabilities of sequences and individual operations. Each API sequence scorer 220 may also provide a confidence value that indicates the degree of certainty the sequence did not arrive due to an out-of-order event. The API sequence scorer 220 can use this confidence value to adjust the probability estimates of sequences during scoring.

In an embodiment, the API sequence scorer 220 ranks sequences according to correlation scores, where a correlation score indicates the amount of association between operations in a sequence. A higher correlation value indicates that API operations are more likely to occur together in the given sequence versus occurring individually in any other context. In an embodiment, the correlation score of a sequence is calculated by dividing the sequence probability of the sequence by the product of the probability of each API operation in the sequence. For instance, if the sequence is of length 3 and consists of API operation 2, API operation 1, and API operation 3, the correlation score is calculated by dividing the sequence probability of the sequence (API operation 2; API operation 1; API operation 3) by the (probability of the API operation 2*probability of the API operation 1*probability of the API operation 3). There can also be a normalizing step to adjust for sequence length such that longer sequences are not artificially ranked higher.

In an embodiment, calculating the sequence probability of the sequence can be done by, for a particular sequence, taking a streaming estimate of the rate of observing the sequence and dividing it by a streaming estimated rate of occurrence of all sequences of the same length as the particular sequence. The streaming estimate of the rate of observing the sequence, and the streaming estimate of occurrence of all sequences of the same length, can be calculated similarly. For instance, the streaming estimate of an event (the sequence, or a sequence of the same length) can be calculated using a counter and a timestamp where on observing the event, the counter is incremented minus a decay value. The decay value can be proportional to the time expired since the counter was last incremented, scaled by the inverse of the estimation interval (e.g., 24 hours). All such rate estimates can be kept current (subtracting decay values on each update) using min-heap data structures on timestamps.

In an embodiment, calculating the probability of each API operation in the sequence can be done by maintaining streaming estimates of most frequently occurring API operations based on identified sequences that are processed by the API sequence scorer 220. To determine the most frequently occurring API operations, a heavy hitters detection algorithm may be used. The streaming estimate of the rate of a particular API operation is divided by a streaming estimate of the rate of all API operations observed in the sequence.

In another embodiment, the API sequence scorer 220 learns a complete statistical model of the API behavior. In such an embodiment, the API sequence scorer 220 may use probabilistic suffix trees (PSTs). A PST is a type of Markov model that is used to model the conditional probabilities in a sequence based on previous observations. The API sequence scorer 220 assumes that the probability of observing the kth API operation given the preceding stream (up to the k−1th API operation) is equivalent to the probability of observing the kth API operation given only the s(k) preceding operations as context. This focuses the model on a more limited context determined by s(k). Training the model involves identifying a set of contexts (sequences of operations that may appear in the stream preceding a single-operation continuation) and for each context estimating a conditional probability distribution over possible continuations. The output in this embodiment may include the estimated rate of occurrence of the sequence, the estimated rate of occurrence of the sequence context (e.g., all API operations in the sequence except the last), and the correlation score.

The algorithm for learning PSTs, which may be performed offline or online, may include determining informative contexts, building a suffix tree, and estimating conditional probabilities. A context c is considered to be informative if the conditional probability of observing x (an API operation) given the entire context c does not equal to the conditional probability of observing x given the context obtained by removing the earliest-occurring operation from the context c. Each context that is considered to be informative is inserted into a suffix tree, which is a tree whose nodes each correspond to a context and where for any given node with label c the parent node has label suffix_1(c), where suffix_1(c) is the sequence when discarding the earliest-occurring operation from the context c. In addition to its label, each node has a probability vector attached, representing the conditional distribution over possible continuations.

In the embodiment where the API sequence scorer 220 learns a complete statistical model of the API behavior, the correlation scores may continue to be calculated (and may be surfaced to the customers). However, the complete statistical model of the API behavior allows the statistical relationship between operations explorable (e.g., given the preceding operations, how frequently does operation X occur).

In either embodiment, the API sequence scorer 220 maintains a limited collection of sequences, ranked by a utility score. In the embodiment where the API sequence scorer 220 does not learn a complete statistical model of API behavior, the utility score is equivalent to the correlation score. In the embodiment where the API sequence scorer 220 learns the complete statistical model of API behavior, the utility score quantifies an estimated probability value that the context of a sequence (all API operations in the sequence except the last) conveys a statistically significant amount of information for predicting the last operation in the sequence, compared to the context suffix (all API operations in the context except the first). When observing a sequence from the sequence identifier, if the sequence is already present in the collection of sequences, its utility score is revised; if the sequence is not already present in the collection of sequences, that sequence replaces the lowest-scoring sequence currently in the collection of sequences.

In either embodiment, a correlation score for each sequence is produced. In the PST approach, the output for each sequence includes: an estimated rate of occurrence, an estimated rate of occurrence of the sequence context, and the correlation score.

In either embodiment, the API sequence scorer 220 periodically inserts the list of sequences ranked by correlation score into the scored sequences data structure 225 that can be exposed to a customer on a dashboard or report (the reporting/dashboard 230). A top-ranking sequence may be one that is significant, where significance is a measure of how important the individual operations are within the sequence. The customer can then act on this report such as securing endpoints if the sequence is expected or applying rules (e.g., rate limiting, blocking, etc.) if such a sequence is not expected. In the PST approach, the conditional probabilities may also be stored in the scored sequences data structure 225.

Although FIG. 2 illustrates the sequence identifier 210 and the sequence scorer 220 being distributed, in other embodiments the sequence identifier and/or sequence scorer is not distributed. For example, each instance of the sequence identifier 210 and/or the sequence scorer 220 may run in separate processes and potentially on different machines to distribute the load such that a single process does not process all the traffic. Alternatively, the sequence identifier 210 and/or the sequence scorer 220 can be run on multiple threads per process on a single machine or single CPU.

Figure 3:
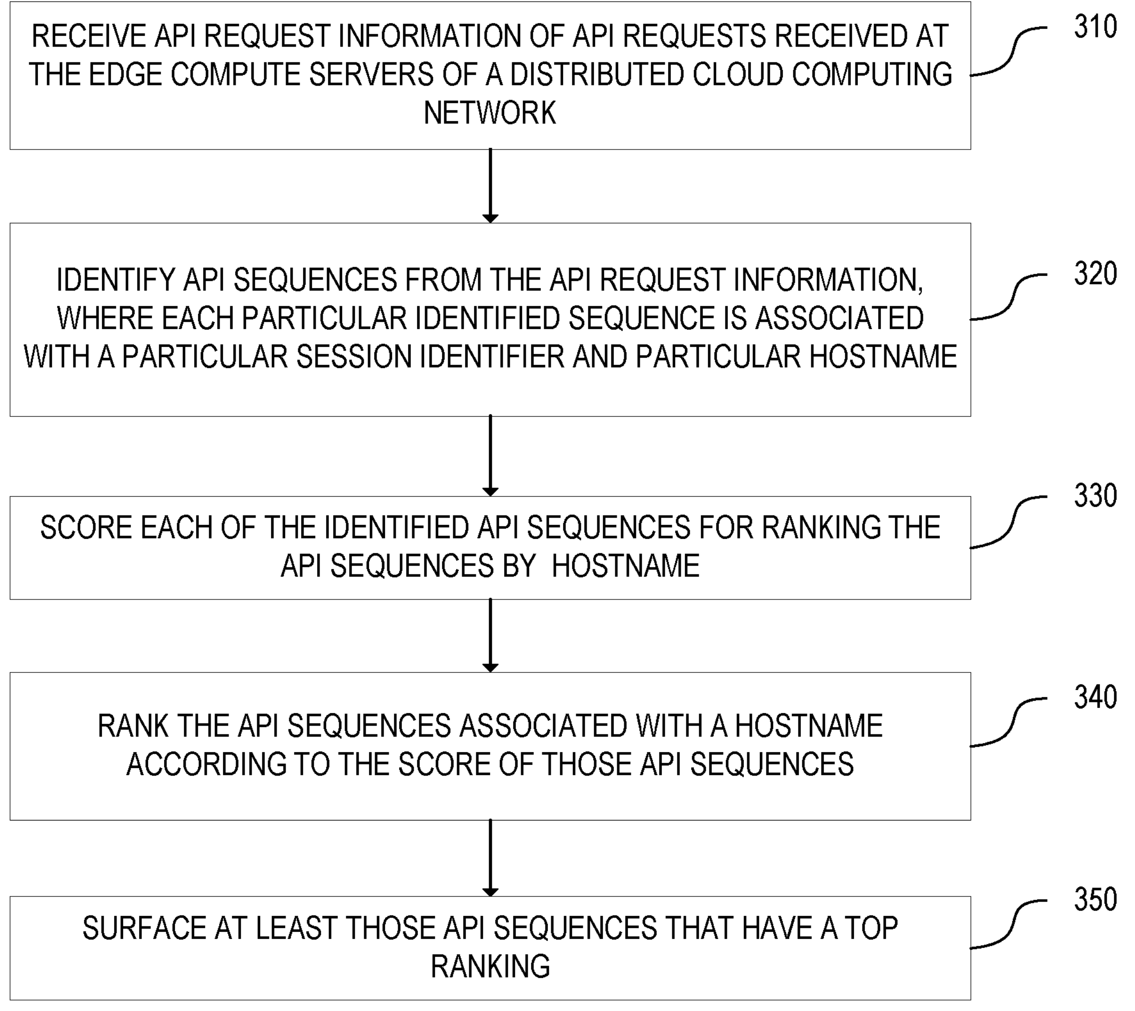
FIG. 3 is a flow diagram that illustrates exemplary operations for identifying and scoring API sequences observed in a distributed cloud computing network according to an embodiment.

FIG. 3 is a flow diagram that illustrates exemplary operations for identifying and scoring API sequences observed in a distributed cloud computing network according to an embodiment. The operations of FIG. 3 are described with reference to the exemplary embodiments of FIGS. 1 and 2. However, the operations of FIG. 3 can be performed by embodiments different from that of FIGS. 1 and 2, and the embodiments of FIGS. 1 and 2 can perform operations different from that of FIG. 3.

At operation 310, the API sequence identifier and scorer 190 receives API request information of API requests received at the edge compute servers 120A-N of the distributed cloud computing network 105. The edge compute servers 120A-N may transmit API request log information to the control server 185. The API request information may be stored in the API request logs 205. The API request information may include, for each API request, the API operation, the time when the API operation was received at that server, the request method (e.g., HTTP GET, HTTP POST), the session identifier associated with the request, an identifier of the server group to which the edge compute server that received the request belongs, and an identifier of the edge compute server that received the request. The API request logs 205 may be partitioned by the server group identifier (e.g., colo identifier) and session identifier such that a particular sequence identifier 210 receives all the API request information for a particular server group identifier and session identifier pair.

Next, at operation 320, a sequence identifier 210 identifies API sequences from the API request information. Each particular identified sequence is associated with a particular session identifier and particular host or grouping of hosts as configured by the administrator of the hosts. Each particular identified sequence includes a time-ordered set of at least two API requests. The sequence identifier 210 may identify API sequences by applying a sliding window of length N to the API requests observed for a particular identifier (e.g., a session identifier) and for a server group that received the API requests. Thus, the sequence identifier 210 identifies API sequences of length N, where N is the number of API operations. The value of N may be configurable by the customer or may be set by the provider of the distributed cloud computing network 105. A higher N leads to a higher number of identified sequences. Because the sequences can be identified over a sliding window, the requests of the sequences can overlap. For instance, a particular API request can be part of multiple identified sequences. The sequence identifiers 210A-N may store the identified API sequences in the sequences store 215.

Next, at operation 330, a sequence scorer 220 scores each of the identified API sequences for ranking the API sequences by host (or zone and/or grouping of hosts) (e.g., stored in the sequences store 215). A particular score for a particular API sequence represents an indication of interest value. In an embodiment, the score is a correlation score generated by the sequence scorer 220. The correlation score indicates the amount of association between operations in a sequence. A higher correlation value indicates that API operations are more likely to occur together in the given sequence versus occurring individually in any other context. In an embodiment, the correlation score of a sequence is calculated by dividing the sequence probability of the sequence by the product of the probability of each API operation in the sequence. In another embodiment, the sequence scorer 220 learns a complete statistical model of the API behavior and computes a correlation score that considers the complete statistical model. In such an embodiment, the API sequence scorer 220 can use a PST as previously described to model the conditional probabilities.

Next, at operation 340, the sequence scorer 220 ranks those API sequences associated with a particular host (or zone and/or grouping of hosts) according to the score of those plurality API sequences. The sequence scorer 220 periodically inserts the list of sequences ranked by correlation score into the scored sequences data structure 225 that can be exposed to a customer on a dashboard or report (the reporting/dashboard 230).

Next, at operation 350, the API sequences that have a top ranking are surfaced to a customer on a dashboard or report (e.g., through the reporting/dashboard 230). The customer may, for example, access and interact with the dashboard or report using the customer client device 195. The identified API sequences may also be available through an API provided by the distributed cloud computing network. The customer can then use the information surfaced to secure endpoints if the sequence is expected and/or applying rules (e.g., rate limiting, blocking, etc.) if such a sequence is not expected. Other information about the API sequences may be surfaced such as a frequency count, a correlation score, etc.

Embodiments have been described that identify a sequence of API requests observed by a distributed cloud computing network and provide analytics about the identified sequences. In other embodiments, either alone or in cooperation with the embodiments describing identifying the sequence of API requests and providing analytics about the same, API sequences are detected at the edge of the distributed cloud computing network (e.g., at the edge compute servers) and API sequence rules are enforced at the edge of the distributed cloud computing network (e.g., at the edge compute servers). As an example, an API sequence rule can be defined to allow only certain API sequences (and all other API sequences are blocked). As another example, an API sequence rule can be defined explicitly block certain API sequences (and all other API sequences are allowed). A customer can have a combination of API sequence rules.

As described earlier, the distributed cloud computing network 105 includes multiple edge compute servers 120A-N, where the number of edge compute servers can be hundreds or more. In an embodiment, the distributed cloud computing network 105 uses anycast such that a particular group of edge compute servers (e.g., connected to the same router of a datacenter) can receive a particular API request because it is the closest to the requesting client device according to an anycast implementation. Which of the group of edge compute servers processes the API request may be determined by the router that receives the request (e.g., according to an equal cost multipath routing mechanism). This means that it is possible, in some implementations of the network, that API requests from a single client device may be processed at different edge compute servers even for the same session.

In an embodiment, the API sequence abuse protection service uses a distributed key-value store that serializes API requests at the edge of the distributed cloud computing network 105 (e.g., at the edge compute servers 120A-N) and has low latency.

Figure 4:
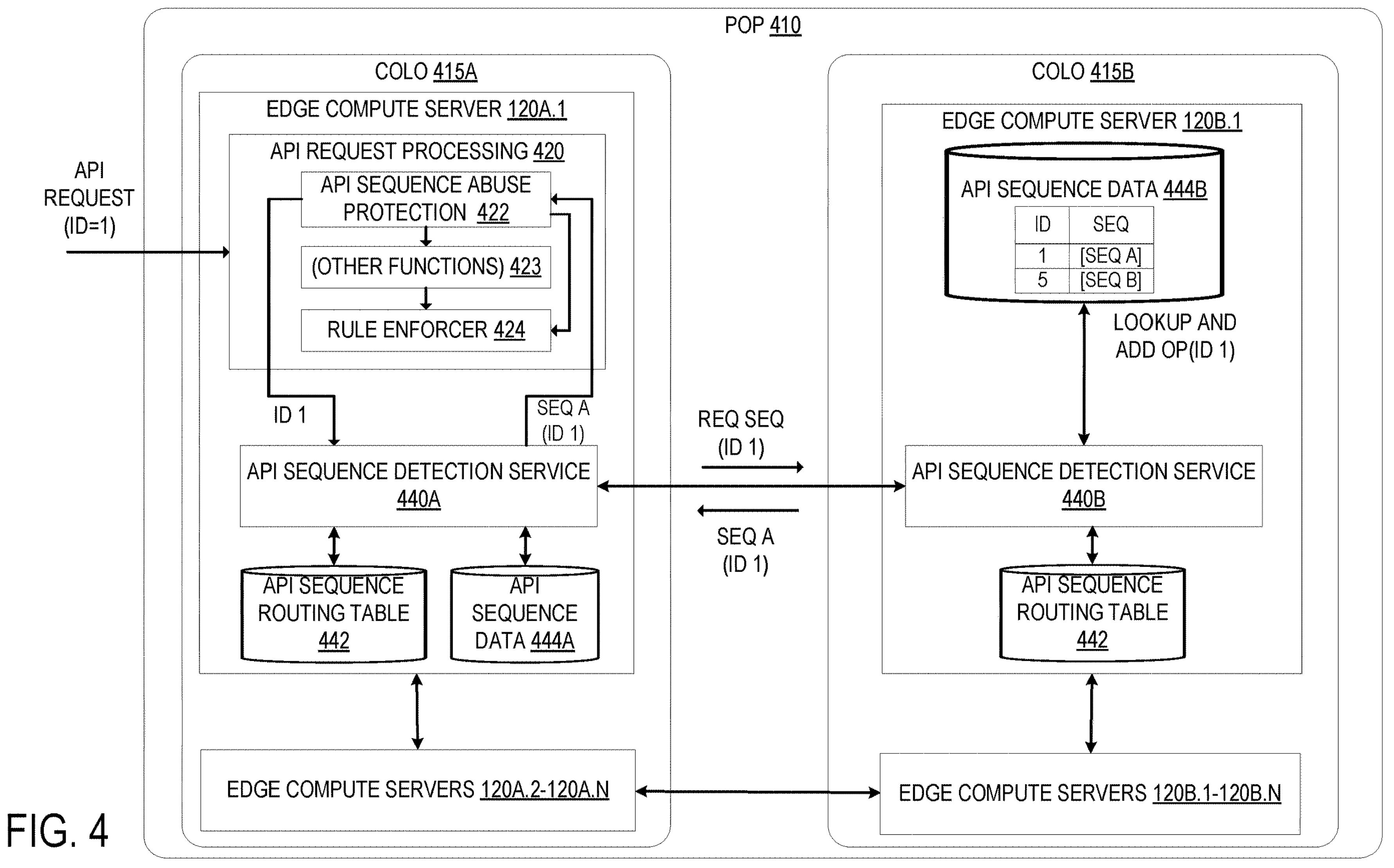
FIG. 4 illustrates an exemplary system for detecting a sequence of API requests at the edge of the distributed cloud computing network and enforcing API sequence rules at the edge of the distributed cloud computing network according to an embodiment.

FIG. 4 illustrates an exemplary system for detecting a sequence of API requests at the edge of the distributed cloud computing network and enforcing API sequence rules at the edge of the distributed cloud computing network according to an embodiment. FIG. 4 illustrates a first server group (the PoP 410) that nests a set of second server groups (a logical grouping of the colos 415A and 415B) and each set of the second server groups includes multiple edge compute servers. As shown in the example of FIG. 4, the colo 415A includes the edge compute servers 120A.1-120A.N, and the colo 415B includes the edge compute servers 120B.1-120B.N. Although FIG. 4 shows a single PoP 410, the distributed cloud computing network 105 can include multiple PoPs. Further, although FIG. 4 shows two colos within a PoP, there may be fewer (e.g., one colo) or more colos within a single PoP. Further, although FIG. 4 shows two levels of server groupings, there may be fewer (e.g., a single server group level) or more server group levels.

In an embodiment, for a given session identifier, a single one of the edge compute servers of a server group of edge compute servers (e.g., a single edge compute server in a PoP, in a colo, or in a data center) is responsible for storing API sequence information. The API sequence information includes up to the last N API operations associated with that session identifier. The API sequence information may also include timing information for the time-ordered sequence of the last N API operations. The timing information may include a map including the time deltas to when the last API operation is observed. The edge compute server may store the API sequence information in an in-memory key-value store such as Memcached, in an in-memory data structure store such as Redis, or other storage system.

When an API request is received at a particular edge compute server 120, that edge compute server 120 determines an identifier that uniquely identifies a session that is associated with the API request. This identifier is sometimes referred herein as a session identifier. The edge compute server that receives the API request is sometimes referred herein as the API call server. The session identifier may be computed through properties present in the API request and which property(ies) may be specified by the customer associated with the API request. As an example, the session identifier may be computed from a header value of the API request (e.g., the HTTP authorization header) and/or from a cookie included in the API request.

The edge compute server 120 that receives the API request (the API call server) then determines which particular edge compute server of the edge compute servers is responsible for storing API sequence information for the determined session identifier. The edge compute server that is responsible for storing API sequence information for the determined session identifier is sometimes referred herein as the API sequence storage server. It is possible that the API call server and the API sequence storage server are the same server or different servers. It is also possible that the API sequence storage server never, or rarely, receives an API request for that session identifier.

In an embodiment, a lookup table is used to determine which edge compute server of the edge compute servers owns the API sequence information data for the session identifier. The lookup table is a partition to server mapping (sometimes referred herein as an API sequence routing table). Each partition is assigned to a single edge compute server. To determine the API sequence storage server for the session identifier, a consistent hashing algorithm is used on the session identifier that provides an integer value. The modulus of the hashed integer value with the number of partitions results in the partition assigned to the session identifier (e.g., partition_id=hash(session_identifier) mod [number_partitions]). Because each partition is assigned to a specific edge compute server, identifying the partition identifies which edge compute server is responsible for storing API sequence information for the session identifier. Each edge compute server of the group stores a copy of this lookup table. Because each edge compute server of the group stores a copy of this lookup table, determining the API sequence storage server is done without needing to transmit a network request; which means a low latency lookup.

The edge compute servers may determine to participate in a group for the distributed storage of the API sequence information. In an embodiment, all edge compute servers of a server group (e.g., a colo, a PoP, a data center) that receive API requests participate in the distributed storage of the API sequence information. To join as a node in the distributed storage system, a particular edge compute server announces their intention to join through a service discovery mechanism. Other edge compute servers read the data. The edge compute servers of a group elect a leader, and the leader computes the API sequence routing table. The leader then distributes the API sequence routing table to its peers. If there is an update (e.g., a node joins the group, a node leaves the group), the leader recalculates the API sequence routing table and distributes updates to its peers.

With respect to FIG. 4, the edge compute server 120A.1 receives an API request that is received at the API request processing module 420. The API request processing module 420 processes the API request including performing a number of functions in a request pipeline including performing function(s) for the API sequence abuse protection 422. In an embodiment, the function(s) for the API sequence abuse protection 422 are performed relatively early in the API request pipeline. The API sequence abuse protection 422 determines the session identifier associated with the API request, which is 1 in the example of FIG. 4. The API sequence abuse protection 422 passes the determined session identifier (and the requested API operation) to the API sequence detection service 440A. This may be passed via a UNIX domain socket. The API request pipeline may include performing other functions 423 while the API sequence information is determined. The API sequence detection service 440A hashes the session identifier and determines, using the API sequence routing table 442, which edge compute server of the edge compute servers is responsible for storing API sequence information for the session identifier. In the example of FIG. 4, the edge compute server 120B.1 is determined to be the API sequence storage server for the session identifier 1. Although the edge compute server 120A.1 is not the API sequence storage server for the session identifier 1, the edge compute server 120A.1 may be the API sequence storage server for other session identifiers. Thus, the edge compute server 120A.1 includes the API sequence data 444A to store API sequence information.

After determining the API sequence storage server for the session identifier, and assuming it is not the same as the API call server, the API call server transmits an API sequence request to the API sequence storage server for the session identifier. This request is to look up and return at least a certain number of previous API operations, if any. The API call server also transmits information about the API operation of the current API request (e.g., the host, method, and path of the API call; a timestamp of when the API call is received). The communication between the API call server and the API sequence storage server may be over a secure connection (e.g., a mutual TLS authenticated gRPC). With respect to FIG. 4, the API sequence detection service 440A transmits an API sequence request for the sequence identifier 1 to the API sequence detection service 440B on the edge compute server 120B.1.

The API sequence storage server receives the API sequence request and accesses the API sequence information it has stored for the session identifier. In an embodiment, the API sequence storage server stores up to the last N API operations for the session identifier, where N is at least two. The API sequence information may also include timing information for the time-ordered sequence of the last N API operations for the session identifier. For example, the timing information may include a map including the time deltas to when the last API operation is observed. The API sequence storage server updates the API sequence information with the current API operation included in the API sequence request. The API sequence storage server returns the sequence information for the session identifier to the API call server. With respect to FIG. 4, the API sequence detection service 440B receives the API sequence request for the session identifier 1, updates the sequence information for the session identifier 1 in the API sequence data 444B using the information in the API sequence request, and returns the sequence information to the API sequence detection service 440A of the edge compute server 120A.1. The API sequence data 444A and 444B may be an in-memory key-value store such as Memcached, an in-memory data structure store such as Redis, or other storage system.

In an embodiment, consecutive requests to the same API endpoint (the same API operation) are deduplicated in the API sequence data. For instance, if the API sequence is the following operations (a, a, a, a, b, c, a), the API sequence data is stored as ((a:5), (b:1), (c:1), (a:1)).

The API call server receives the API sequence information from the API sequence storage server. The API call server then uses this API sequence information to enforce API sequence rule(s) on the API request. For instance, an API sequence rule can be defined to allow only certain API sequences (and all other API sequences are blocked). As another example, an API sequence rule can be defined to explicitly block certain API sequences (and all other API sequences are allowed). An API sequence rule can have one or more time components. For example, an API sequence rule can be defined to allow a certain API operation only if it occurred at least a certain amount of time after another certain API operation but no more than another certain amount of time (e.g., operation B is allowed only if it is received more than 250 ms but less than 5 seconds after operation A). The customer may define the rules and may have any combination of rules. The customer may also specify the action to take if a rule matches (e.g., block, allow, log).

With respect to FIG. 4, the API sequence detection service 440A receives the API sequence information for the session identifier 1 (sequence A) and passes the API sequence information to the API sequence abuse protection 422. The API sequence abuse protection 422 then provides the sequence information to the rule enforcer 424 to enforce the API sequence rules applicable for the zone and host.

In an embodiment, the API call server determines the API sequence information for the session identifier of the current API request asynchronously to other processing for the API request. To say it another way, the processing of the API request is performed concurrently with determining the API sequence information. By the time the API request processing pipeline is ready to enforce rules, the API sequence information is typically available to the rule enforcer. This reduces tail latencies in API request processing because the processing does not typically need to wait for the API sequence information.

As previously described, API sequence rules can be enforced at the edge of the distributed cloud computing network. In an embodiment, a customer can define the API sequence rule(s) that apply to their zone and host. The control server 185 may provide an interface for the customer to define and apply such rule(s). Each rule defines the criteria that define a match and an action that specifies the action to take if matched. For instance, an API sequence rule can be defined such that it allows only certain API sequences (and all other API sequences are blocked). As another example, an API sequence rule can be defined to explicitly block certain API sequences (and all other API sequences are allowed). An API sequence rule can have one or more time components. For example, an API sequence rule can be defined to allow a certain API operation only if it occurred at least a certain amount of time after another certain API operation but no more than another certain amount of time (e.g., operation B is allowed only if it is received more than 250 ms but less than 5 seconds after operation A). The customer may define the rules and may have any combination of rules. The customer may also specify the action to take if a rule matches (e.g., block, allow, log). A rule may also include other conditions. For example, the rule may specify that a certain API sequence is allowed (or denied) only if coming from a particular one or more countries and/or networks. As another example, the rule may specify that a certain API sequence is allowed (or denied) for specific user agents. As another example, the rule may specify that a certain API sequence is allowed (or denied) when specific properties in JSON Web Token claims are met.

In an embodiment, based on the identified sequences (e.g., the top-ranked sequences), the system may suggest one or more API sequence rules for abuse mitigation. For example, an API sequence rule may be suggested when the probability that given a particular operation, that particular operation will have been immediately preceded by another particular operation, is above a threshold. As another example, a heap data structure may be maintained that includes candidate rules. A candidate rule is a sequence of one or more pairs of operations in the sequence. Each candidate rule is scored according to an estimated precedence probability, which is based on rate estimates of observing all API operations in the candidate rule versus observing the last API operation in the candidate rule. A confidence score can be obtained by dividing the rate estimate of observing all operations in the candidate rule by the last API operation observed in the candidate rule. The confidence score can be adjusted for the probability of a non-recoverable out-of-order API request occurring. Such a candidate rule whose adjusted precedence probability exceeds a threshold may be surfaced as suggestions. In this example, the surfaced rules would be associated with an allow action as these are based on the assumption that the observed sequences are normal.

Figure 5:
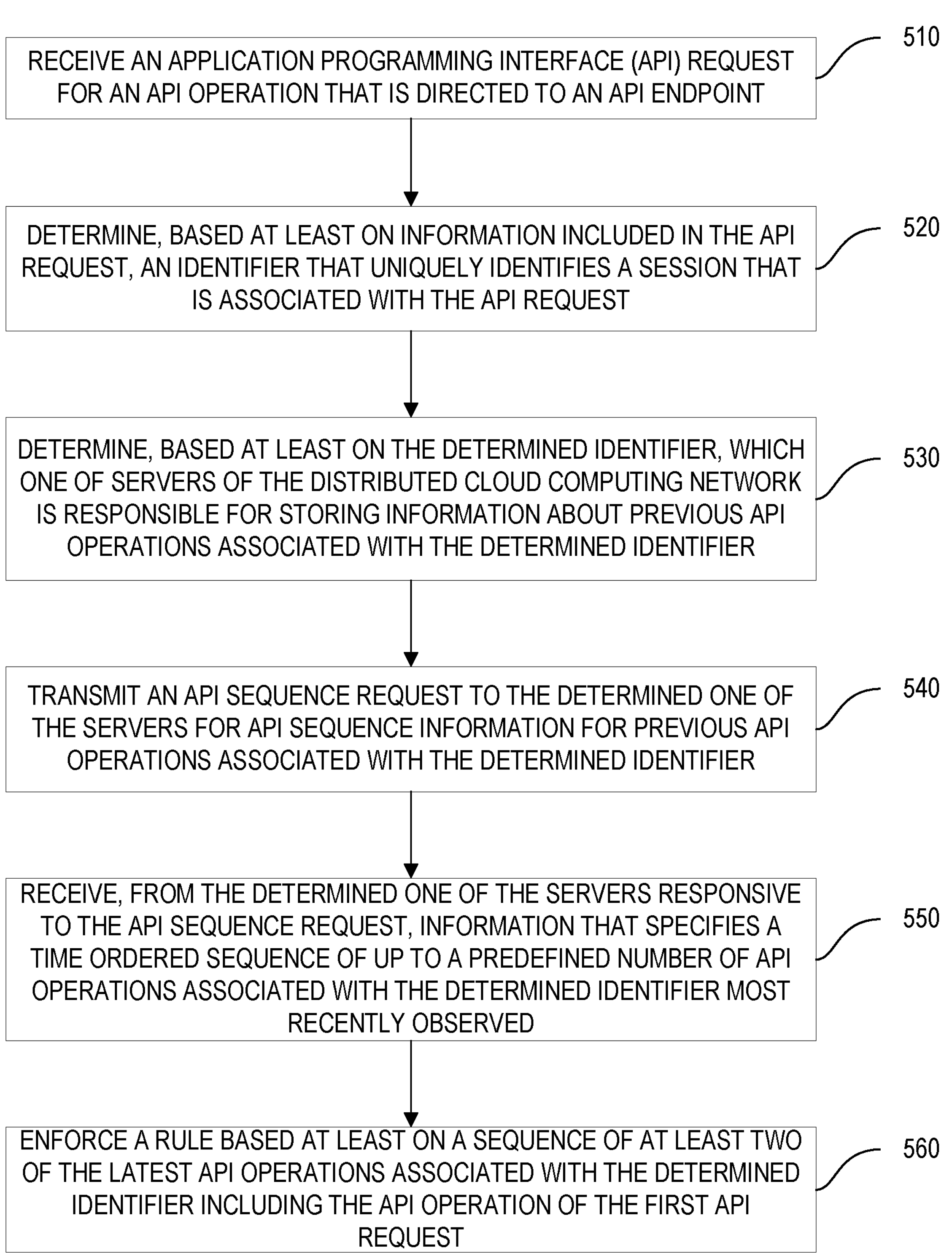
FIG. 5 is a flow diagram that illustrates exemplary operations for detecting a sequence of API requests at the edge of the distributed cloud computing network and enforcing API sequence rules at the edge of the distributed cloud computing network according to an embodiment.

FIG. 5 is a flow diagram that illustrates exemplary operations for detecting a sequence of API requests at the edge of the distributed cloud computing network and enforcing API sequence rules at the edge of the distributed cloud computing network according to an embodiment. The operations of FIG. 5 are described with reference to the exemplary embodiments of FIGS. 1 and 4. However, the operations of FIG. 5 can be performed by embodiments different from that of FIGS. 1 and 4, and the embodiments of FIGS. 1 and 4 can perform operations different from that of FIG. 5.

At operation 510, a first edge compute server 120A.1 of a distributed cloud computing network 105 receives an API request for an API operation that is directed to an API endpoint of a host. The API request may be received from a client computing device such as a client device 110A. The API endpoint may be located at a server that is external to the distributed cloud computing network 105 (e.g., the origin server 180). The first edge compute server 120A.1 is part of a server group of edge compute servers. For example, the first edge compute server 120A.1 may be part of a first PoP 410 of multiple PoPs of the distributed cloud computing network 105. Each PoP may include one or more colos. For example, the PoP 410 includes the colo 415A and the colo 415B. In the example of FIG. 5, the first edge compute server 120A.1 is sometimes referred to as the API call server because it received the API request. The API request processing module 420 begins processing the API request.

Next, at operation 520, the first edge compute server 120A.1 determines, based at least on information included in the API request, an identifier that uniquely identifies a session that is associated with the API request. This identifier is sometimes referred to in this example as a session identifier. The identifier may be computed from a header value of the API request (e.g., the HTTP authorization header) and/or from a cookie included in the API request. The entity associated with the API endpoint may specify how to compute the session identifier based on the information included in the API request (e.g., may specify to use value in the HTTP authorization header). As an example, the API sequence abuse protection 422 determines the session identifier for the received API request. The API sequence abuse protection 422 may pass the determined session identifier, and requested API operation, to the API sequence detection service 440A (e.g., over a UNIX domain socket).

The API request processing module 420 may continue to process the API request using the other functions 423. The other functions 423 may include a number of other functions performed during the request processing. As examples, the API request may go through a threat scoring process to calculate a threat score, rewriting the API request, and/or determining routing of the API request.

Next, at operation 530, the first edge compute server 120A.1 determines, based on the determined session identifier, which one of the edge compute servers of the distributed cloud computing network 105 is responsible for storing information about previous API operations associated with the determined session identifier (e.g., time-ordered set of API operations associated with the determined session identifier). In an embodiment, for a given session identifier, a single one of the edge compute servers of a server group of edge compute servers (e.g., a single edge compute server in a PoP or in a colo) is responsible for storing API sequence information. A lookup table may be used to determine which edge compute server of the edge compute servers owns the API sequence information data for the session identifier. To determine this edge compute server, the API sequence detection service 440A applies a consistent hashing algorithm on the session identifier to produce an integer and takes the modulus of that integer with the number of edge compute servers of the group to get the index to the lookup table that specifies the identity of the edge compute server that is responsible for storing API sequence information. Each edge compute server of the group stores a copy of this lookup table. In the example of FIG. 5, the determined edge compute server that is responsible for storing information about previous API operations associated with the determined session identifier is sometimes referred to as the API sequence storage server.

Next, at operation 540, the API call server (e.g., the first edge compute server 120A.1) transmits an API sequence request to the API sequence storage server (e.g., the edge compute server 120B.1) for API sequence information for previous API operations associated with the determined session identifier. The API sequence request includes the session identifier and information about the API operation of the API request (e.g., host, method, and path of the API call; a timestamp of when the API call was received). The API sequence request is for returning information about at least a certain number of previous API operations, if any, for the session identifier. The communication between the API call server and the API sequence storage server may be over a secure connection (e.g., a mutual TLS authenticated gRPC).

Figure 6:
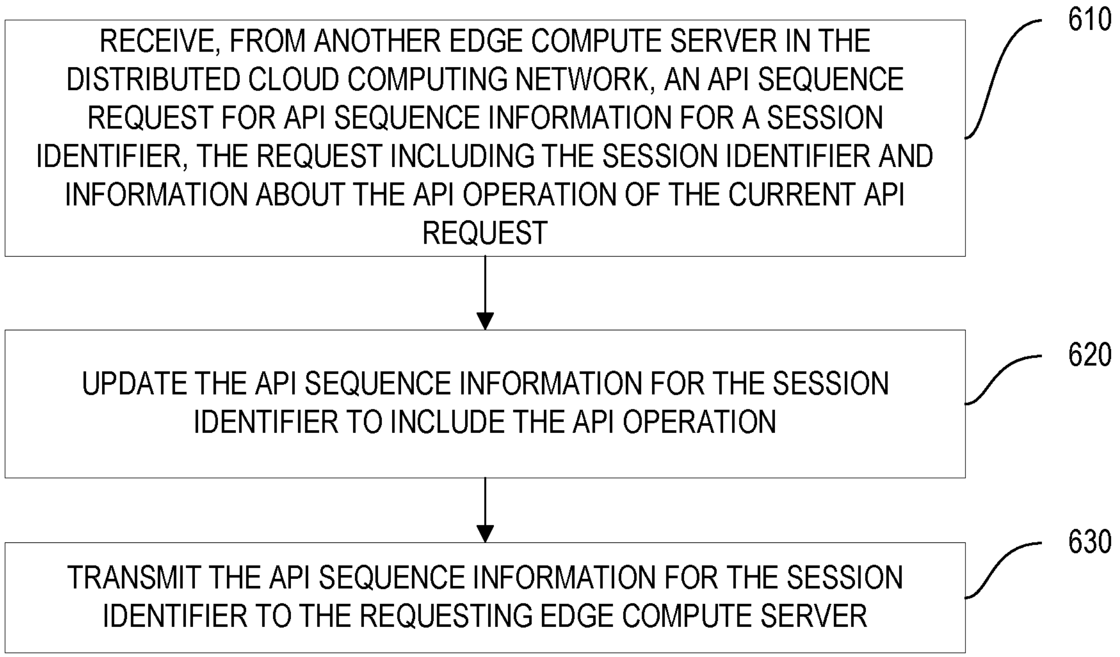
FIG. 6 is a flow diagram that illustrates exemplary operations for an edge compute server returning API sequence information according to an embodiment.

FIG. 6 is a flow diagram that illustrates exemplary operations for an edge compute server returning API sequence information according to an embodiment. The operations of FIG. 6 are described with reference to the exemplary embodiments of FIGS. 1 and 4. However, the operations of FIG. 6 can be performed by embodiments different from that of FIGS. 1 and 4, and the embodiments of FIGS. 1 and 4 can perform operations different from that of FIG. 6.

At operation 610, an edge compute server (e.g., the edge compute server 120B.1) receives, from another edge compute server (e.g., the edge compute server 120A.1) in the distributed cloud computing network 105, an API sequence request for API sequence information for a session identifier. For example, the API sequence detection service 440B receives this API sequence request from the API sequence detection service 440A. This API sequence request includes the session identifier and information about the API operation of the API request (e.g., host, method, and path of the API call; a timestamp of when the API call was received). This API sequence request may be like the one transmitted in operation 540 of FIG. 5. The API sequence information stored by the edge compute server 120A.1 includes information up to the last N API operations for the session identifier, where Nis at least two. The information specifies a listing of the last N operations for the session identifier, and may include timing information for the time-ordered sequence of the last N API operations for the session identifier. For example, the timing information may include a map including the time deltas to when the last API operation is observed. The API sequence information is stored in the API sequence data 444B, which may be an in-memory key-value store such as Memcached, an in-memory data structure store such as Redis, or other storage system.

Next, at operation 620, the edge compute server (e.g., the edge compute server 120B.1) updates the stored API sequence information for the session identifier to include the API operation of the API request. For example, the API sequence detection service 440B updates the sequence information for the session identifier in the API sequence data 444B using the information in the API sequence request.

Next, at operation 630, the edge compute server (e.g., the edge compute server 120B.1) transmits the API sequence information for the session identifier to the requesting edge compute server (e.g., the edge compute server 120A.1). The API sequence detection service 440B transmits this information to the API sequence detection service 440A. In an embodiment, consecutive requests to the same API endpoint (the same API operation) are deduplicated in the API sequence data. For instance, if the API sequence is the following operations (a, a, a, a, b, c, a), the API sequence data is stored as ((a:5), (b:1), (c:1), (a:1)). In such an embodiment, the API sequence information transmitted is deduplicated.

Returning back to FIG. 5, at operation 550, the API call server (e.g., the first edge compute server 120A.1) receives, from the API sequence storage server (e.g., the edge compute server 120B.1), information that specifies a time-ordered sequence of up to a predefined number of API operations associated with the determined session identifier that are most recently observed. The API sequence detection service 440A receives this information from the API sequence detection service 440B. It should be noted that these API operations may have been received and processed at different edge compute servers of the server group (e.g., different edge compute servers at the same colo, same PoP, or same data center). This sequence information may not include API operations associated with the determined session identifier that were received and processed by edge compute servers outside of the server group (e.g., at a different PoP). The received API sequence information may include timing information such as the time deltas to when the last API operation is observed. The API sequence detection service 440A passes this information to the API sequence abuse protection 422 (e.g., via the Unix domain socket).

Next, at operation 560, the API call server enforces a rule based at least on a sequence of at least two of the latest API operations associated with the determined identifier including the API operation of the current API request. The API sequence abuse protection 422 may cause this information to be made available to the rule enforcer 424 to enforce the rules. For instance, an API sequence rule can be defined to allow only certain API sequences (and all other API sequences are blocked). As another example, an API sequence rule can be defined to explicitly block certain API sequences (and all other API sequences are allowed). An API sequence rule can have one or more time components. For example, an API sequence rule can be defined to allow a certain API operation only if it occurred at least a certain amount of time after another certain API operation but no more than another certain amount of time (e.g., operation B is allowed only if it is received more than 250 ms but less than 5 seconds after operation A). The customer may define the rules and may have any combination of rules. The customer may also specify the action to take if a rule matches (e.g., block, allow, log). The defined rules may have been suggested by the distributed cloud computing network.

Figure 7:
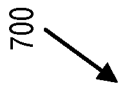
FIG. 7 illustrates a block diagram for an exemplary data processing system that may be used in some embodiments.
Figure 7:
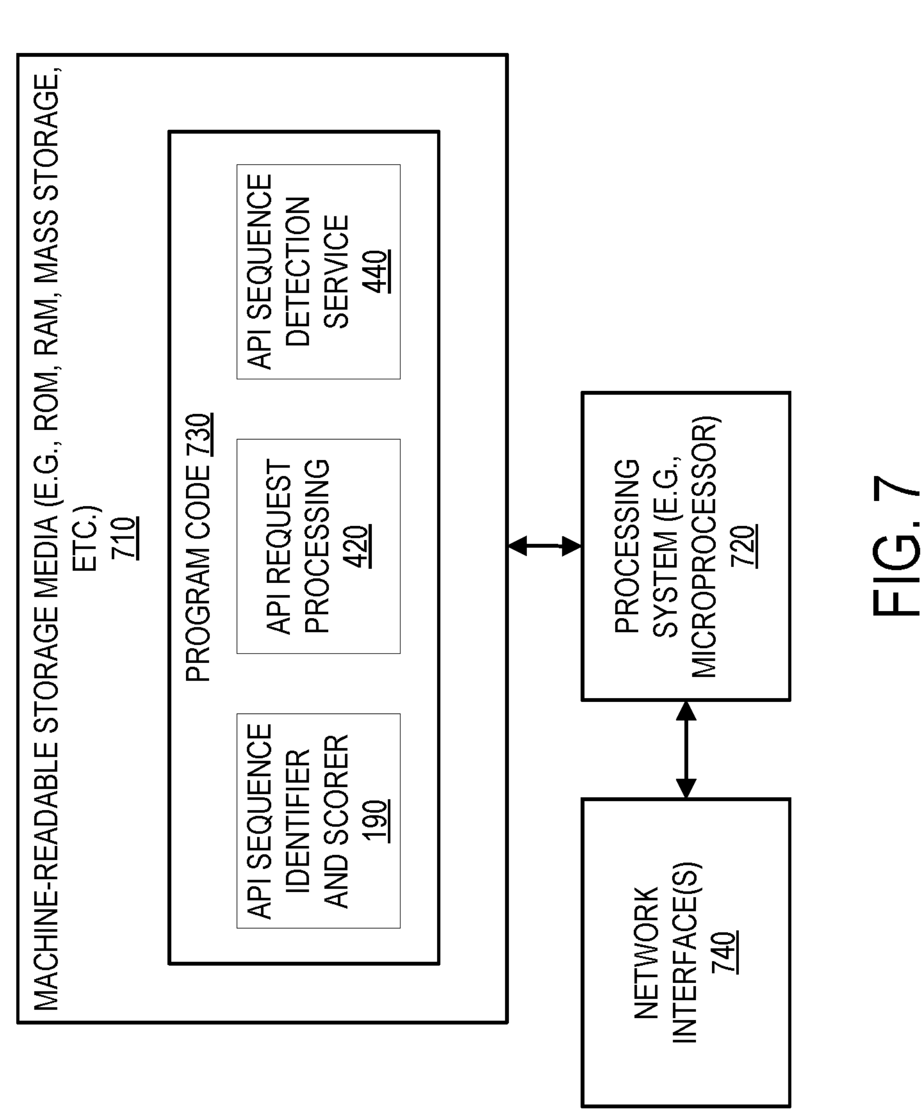

FIG. 7 illustrates a block diagram for an exemplary data processing system 700 that may be used in some embodiments. One or more such data processing systems 700 may be used to implement the embodiments and operations described with respect to an edge compute server 120 and/or the control server 185. The data processing system 700 is a computing device that stores and transmits (internally and/or with other computing devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 720 (e.g., one or more processors and connected system components such as multiple connected chips). For example, the depicted machine-readable storage media 710 may store program code 730 that, when executed by the processing system 720, causes the data processing system 700 to execute the API sequence identifier and scorer 190, the API request processing module 420, and/or the API sequence detection service 440, and/or perform any of the operations described herein.

The data processing system 700 also includes one or more network interfaces 740 (e.g., a wired and/or wireless interfaces) that allows the data processing system 700 to transmit data and receive data from other computing devices, typically across one or more networks (e.g., Local Area Networks (LANs), the Internet, etc.). Additional components, not shown, may also be part of the system 700, and, in certain embodiments, fewer components than that shown are used. One or more buses may be used to interconnect the various components shown in FIG. 7.

The techniques shown in the figures can be implemented using code and data stored and executed on one or more electronic devices (e.g., a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

In the preceding description, numerous specific details are set forth to provide a more thorough understanding. It will be appreciated, however, by one skilled in the art that embodiments may be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:

receiving an application programming interface (API) request for an API operation that is directed to an API endpoint of a host, wherein the API request is received at a first one of a plurality of edge compute servers of a distributed cloud computing network;

determining, based at least on information included in the API request, an identifier that uniquely identifies a session that is associated with the API request;

determining, based at least on the determined identifier, which one of the plurality of edge compute servers of the distributed cloud computing network is responsible for storing information about previous API operations associated with the determined identifier;

transmitting an API sequence request to the determined one of the plurality of edge compute servers for API sequence information for previous API operations associated with the determined identifier;

receiving, from the determined one of the plurality of edge compute servers responsive to the API sequence request, information that specifies a time-ordered sequence of up to a predefined number of API operations associated with the determined identifier most recently observed; and enforcing a rule based at least on a sequence of at least two API operations associated with the determined identifier whose API requests are received latest including the API operation of the first API request.

2. The method of claim 1, further comprising:

receiving, from the determined one of the plurality of edge compute servers responsive to the API sequence request, timing information for the time-ordered sequence of the predefined number of API operations associated with the determined identifier most recently observed.

3. The method of claim 1, wherein the rule defines a particular sequence of API operations, and wherein the rule specifies blocking the API request when the particular sequence of API operations is matched.

4. The method of claim 1, wherein the rule defines a particular sequence of API operations, and wherein the rule specifies allowing the API request only when the particular sequence of API operations is matched.

5. The method of claim 1, wherein the API sequence request includes information about the API operation of the API request.

6. The method of claim 1, wherein the API endpoint is located on a server that is external to the distributed cloud computing network.

7. The method of claim 1, wherein the first one of the plurality of edge compute servers is part of a first Point-of-Presence (POP) of the distributed cloud computing network, wherein the determined one of the plurality of edge compute servers is part of the first POP, wherein the first PoP is one of a plurality of PoPs of the distributed cloud computing network, and wherein the previous API operations associated with the determined identifier occurred only at edge compute servers that are part of the first PoP.

8. The method of claim 1, wherein the identifier is computed from a header value of the API request or from a cookie included in the API request.

9. The method of claim 1, wherein the determining which one of the plurality of edge compute servers is to store information about previous API operations associated with the determined identifier is performed using consistent hashing based routing.

10. The method of claim 1, wherein the rule is suggested based on at least performing operations including:

scoring each of a plurality of API sequences of the host that are observed at the distributed cloud computing network, wherein a particular score for a particular API sequence indicates an amount of association between API operations in that particular sequence;

ranking the plurality of API sequences of the host according to the score of the plurality of API sequences; and surfacing at least those of the plurality of API sequences that have a top ranking, wherein the rule is based on at least one of the surfaced API sequences.

11. A non-transitory machine-readable storage medium that provides instructions that, if executed by a processor, will cause said processor to perform operations, comprising:

receiving an application programming interface (API) request for an API operation that is directed to an API endpoint of a host, wherein the API request is received at a first one of a plurality of edge compute servers of a distributed cloud computing network;

determining, based at least on information included in the API request, an identifier that uniquely identifies a session that is associated with the API request;

determining, based at least on the determined identifier, which one of the plurality of edge compute servers of the distributed cloud computing network is responsible for storing information about previous API operations associated with the determined identifier;

transmitting an API sequence request to the determined one of the plurality of edge compute servers for API sequence information for previous API operations associated with the determined identifier;

receiving, from the determined one of the plurality of edge compute servers responsive to the API sequence request, information that specifies a time-ordered sequence of up to a predefined number of API operations associated with the determined identifier most recently observed; and enforcing a rule based at least on a sequence of at least two API operations associated with the determined identifier whose API requests are received latest including the API operation of the first API request.

12. The non-transitory machine-readable storage medium of claim 11, wherein the operations further comprise:

receiving, from the determined one of the plurality of edge compute servers responsive to the API sequence request, timing information for the time-ordered sequence of the predefined number of API operations associated with the determined identifier most recently observed.

13. The non-transitory machine-readable storage medium of claim 11, wherein the rule defines a particular sequence of API operations, and wherein the rule specifies blocking the API request when the particular sequence of API operations is matched.

14. The non-transitory machine-readable storage medium of claim 11, wherein the rule defines a particular sequence of API operations, and wherein the rule specifies allowing the API request only when the particular sequence of API operations is matched.

15. The non-transitory machine-readable storage medium of claim 11, wherein the API sequence request includes information about the API operation of the API request.

16. The non-transitory machine-readable storage medium of claim 11, wherein the API endpoint is located on a server that is external to the distributed cloud computing network.

17. The non-transitory machine-readable storage medium of claim 11, wherein the first one of the plurality of edge compute servers is part of a first Point-of-Presence (POP) of the distributed cloud computing network, wherein the determined one of the plurality of edge compute servers is part of the first POP, wherein the first POP is one of a plurality of PoPs of the distributed cloud computing network, and wherein the previous API operations associated with the determined identifier occurred only at edge compute servers that are part of the first PoP.

18. The non-transitory machine-readable storage medium of claim 11, wherein the identifier is computed from a header value of the API request or from a cookie included in the API request.

19. The non-transitory machine-readable storage medium of claim 11, wherein the determining which one of the plurality of edge compute servers is to store information about previous API operations associated with the determined identifier is performed using consistent hashing based routing.

20. The non-transitory machine-readable storage medium of claim 11, wherein the rule is suggested based on at least performing operations including:

scoring each of a plurality of API sequences of the host that are observed at the distributed cloud computing network, wherein a particular score for a particular API sequence indicates an amount of association between API operations in that particular sequence;

ranking the plurality of API sequences of the host according to the score of the plurality of API sequences; and surfacing at least those of the plurality of API sequences that have a top ranking, wherein the rule is based on at least one of the surfaced API sequences.

* * * * *